United States Patent [19]
Weill et al.

[11] Patent Number: 5,931,297
[45] Date of Patent: Aug. 3, 1999

[54] NOTEBOOK COMPUTER PROTECTIVE COVER

[76] Inventors: Christopher P. Weill, 300 Darrell Rd., Hillsborough, Calif. 94010; James R. Forte, 1822 Laguna St., Santa Barbara, Calif. 93101

[21] Appl. No.: 08/827,438

[22] Filed: Mar. 27, 1997

[51] Int. Cl.$^6$ .................................................. B65D 85/00
[52] U.S. Cl. ......................... 206/320; 206/576; 206/592; 206/522; 383/89
[58] Field of Search ...................... 206/320, 516, 206/591, 592, 594, 522; 383/89, 3

[56] References Cited

U.S. PATENT DOCUMENTS

| | | |
|---|---|---|
| D. 237,755 | 11/1975 | Ray, Jr. . |
| 733,081 | 7/1903 | Rohde ........................ 383/89 |
| 790,194 | 5/1905 | Douglass et al. .................... 383/89 |
| 4,569,082 | 2/1986 | Ainsworth et al. ................... 206/522 |
| 4,709,817 | 12/1987 | Keady et al. ........................ 206/592 |
| 5,025,921 | 6/1991 | Gasparaitis et al. .................. 206/320 |
| 5,092,459 | 3/1992 | Uljanic et al. . |
| 5,197,178 | 3/1993 | Lichte et al. . |
| 5,325,970 | 7/1994 | Dillon et al. . |
| 5,385,232 | 1/1995 | Foos et al. ......................... 206/594 |
| 5,400,903 | 3/1995 | Cooley . |
| 5,570,780 | 11/1996 | Miller . |
| 5,622,262 | 4/1997 | Sadow ............................ 206/591 |

FOREIGN PATENT DOCUMENTS 2533-896  4/1984  France ........................ 206/576

*Primary Examiner*—Paul T. Sewell
*Assistant Examiner*—Nhan T. Lam
*Attorney, Agent, or Firm*—Lyon, Harr & Defrank, LLP; Richard T. Lyon

[57] ABSTRACT

A glove-like protective cover capable of encasing a notebook computer, thereby allowing it to be used in a hostile operating environment, such as outdoors or at a manufacturing site, without risk of debris and moisture reaching the computer and detrimentally affecting its performance. The protective cover includes a top pocket capable of having the screen section of the notebook computer inserted therein, and a bottom pocket capable of having the keyboard section of the computer inserted therein. In this way, the notebook computer can be placed in its open, operating position while encased in the protective cover. The portions of the cover overlying the screen and keyboard sections of the computer are transparent. Thus, an operator is able to see the screen and keyboard of the notebook computer through the protective cover. Further, the portion of the cover overlying the keyboard of the computer is flexible so as to allow the keyboard to be operated through the cover. The protective cover may also employ a shock absorbing apparatus capable of protecting the notebook computer from damage caused by impacts with other objects during transit or while in use.

20 Claims, 2 Drawing Sheets

NOTEBOOK COMPUTER PROTECTIVE COVER

BACKGROUND

1. Technical Field

This invention relates to protective covers for electronic equipment, and more particularly, to protective covers for notebook computers.

2. Background Art

Notebook computers (also sometimes referred to as laptop computers) are widely used today because of their convenience and portability. In the past, notebook computers have been restricted to use in relatively benign environments, such as in a home or office. Notebook computers are also often used in airplanes and other modes of transportation, as well as in airports and the like. These environments are also relatively benign.

The inherent portability of a notebook computer, however, provides an opportunity for the computer to be used in more hostile environments. For example, a notebook computer can often be advantageously employed outdoors, such as at construction sites, oil fields, or other remote work locations where a computer operator must work without shelter. This outdoor use can expose the notebook computer to a variety of hazards, such as wind blown dirt and debris, and moisture from rain, fog, snow, etc. The use of computers has also been extended into manufacturing environments, such as a factory floor. Notebook computers because of their portability and size are ideally suited for use in such manufacturing sites. However, even though the notebook computer is being used indoors, a manufacturing environment can expose it to many hazards. For instance, the computer could be exposed to dripping and spilled liquids, dirt, machine shavings, sawdust, and other debris.

The moisture and debris associated with the aforementioned hostile environments can damage or destroy a notebook computer. For example, liquids or dirt falling onto the keyboard of a notebook computer can readily enter the computer through the spaces between the keys, thereby detrimentally affecting the electronics and mechanisms disposed underneath the keyboard. Even where the electronics and mechanisms below the keyboard are sealed, debris can still lodge in the keys of the keyboard and foul their operation. Moisture and debris can have equally devastating affects on the screen of a notebook computer, as well as the hinge mechanism used to join the screen to the keyboard section.

Traditionally, notebook computers have been protected via a carrying case. Typical carrying cases often take the form of a soft-sided bag into which the notebook computer is slipped. These types of cases usually have padded walls to assist in protecting the notebook computer from shock. The carrying case serves the sole function of aiding the user in carrying the notebook computer during transit. However, once the computer is put in use, the cover is usually set aside and serves no further purpose until it is again needed to carry the computer. Thus, these traditional carrying cases do nothing to protect the computer while in use.

Another common type of carrying case resembles a hard-sided suitcase. This type of carrying case usually has a bottom section into which the notebook computer is secured, and a hinged lid. The interiors of these hard-sided cases also typically have padding or support structures which protect the computer from shock. Many of these cases have also been configured so as to allow the computer to be used without removing it from the case. Usually, the lid is swung back out of the way and the computer remains secured within the bottom section. It is also known to provide side panels in these types of cases to offer some protection from wind. Some of these cases even have overhead panels for the same purpose. In one instance the overhead panel is adapted to lie at an angle in front of the screen of an open notebook computer. This overhead panel is transparent so that the user could still see the screen, and provides some minimal protection of the computer from wind blown debris.

Many variations of the above-described basic types of carrying cases are also known. However, none of these are capable of adequately protecting a notebook computer during use from the relatively hostile environments encountered outdoors or at a manufacturing site.

Wherefore, it is an object of the present invention to provide a protective cover for a notebook computer which is capable of protecting the computer from the debris and moisture associated with hostile environments, while at the same time allowing the notebook computer to be operated in these environments.

Wherefore, it is another object of the present invention to provide a protective cover for a notebook computer which is capable of protecting the computer from impact shock occurring during transit or when in use in the aforementioned hostile environments.

SUMMARY

The above-described objectives are realized with embodiments of the present invention directed to a glove-like protective cover which encases a notebook computer. The protective cover is configured in such a way that the notebook computer can be placed in its open position while installed within the cover. Further, the portions of the cover overlying at least the screen and keyboard sections of the computer are transparent. Thus, an operator is able to see the screen and keyboard of the notebook computer through the protective cover. The portion of the cover overlying the keyboard of the computer is also flexible so as to allow the keyboard to be operated through the cover. Accordingly, the protective cover allows the notebook computer to be used in a hostile operating environment, such as outdoors or at a manufacturing site, without risk of debris and moisture reaching the computer and detrimentally affecting its performance.

The protective cover includes a top pocket capable of having the screen section and a first portion of the hinged section inserted therein and a bottom pocket capable of having the keyboard section and a remaining portion of the hinged section inserted therein. The top and bottom pockets have a common interior wall which at least overlies the screen, keyboard, and hinged sections of the notebook computer. As mentioned above, the portions of the common interior wall which respectively overlie the screen and keyboard sections of the notebook computer are transparent so as to allow an operator to see the screen and keyboard sections through the first and second transparent portions of the common interior wall. Further, it is preferred that the portion of the interior wall overlying the hinged section of the notebook computer also be transparent so that the operator can see the indicator lights typically found on the computer in this area. The transparent portion of the interior wall overlying the keyboard section of the computer is flexible, as mentioned above, and is capable of allowing activation of a key on the keyboard section of the notebook computer without inadvertently activating any adjacent key.

In one embodiment of the protective cover, the portion of its interior wall which overlies the keyboard section also has a shape conforming to the keys of the keyboard, so as to further facilitate operation of the keyboard.

The top and bottom pockets of the protective cover have respective exterior walls opposite the aforementioned common interior wall. An entry sleeve having an open first end and a second end connected at an upper side to the exterior wall of the top pocket and at a lower side to the exterior wall of the bottom pocket is also part of the protective cover. This entry sleeve is sized such that the notebook computer can slide through it from its open end for insertion into the top and bottom pockets. The entry sleeve has a sealing mechanism adjacent to the open end of the sleeve which is capable of holding the end closed. This sealing mechanism may, if desired, provide a watertight and/or hermetic seal. The entry sleeve is also capable of being folded onto the top pocket where a securing device is employed to releasably secure it to the pocket.

Another securing device can also be employed on the protective cover to releasably secure the top pocket to the bottom pocket. In this way, the screen and keyboard sections of the notebook computer can be held in a closed position when the computer is not in use. Preferably, all the securing devices take the form of a two-piece strap assembly.

At least one non-slip pad can be attached to the outer surface of the exterior wall of the bottom section so as to prevent slipping of the notebook computer should it be placed onto a slippery surface. Preferably, there are two such non-slip pads affixed to the outer surface and placed in relation to each other so as to prevent rocking of the notebook computer about the pads.

The protective cover may also employ a shock absorbing apparatus capable of protecting the notebook computer from damage from impacts with other objects during transit or while in use. Preferably, this apparatus includes first and second shock absorbing units respectively disposed adjacent the inner surface of the exterior wall of the top pocket and the inner surface of the exterior wall of the bottom pocket. The width and length of these units is approximately the same as that of the screen and keyboard sections of the notebook computer, respectively. The shock absorbing units can be attached directly to the aforementioned inner surfaces, such as by an adhesive, or they could be removably retained within respective pouches attached to the inner surfaces. If used, the pouches have the advantage of allowing the shock absorbing units to be removed or replaced. In one embodiment of the protective cover, the shock absorbing units are shock absorbing pads, while in another embodiment they are shock absorbing bladders filled with one of a liquid, gel, or gas.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
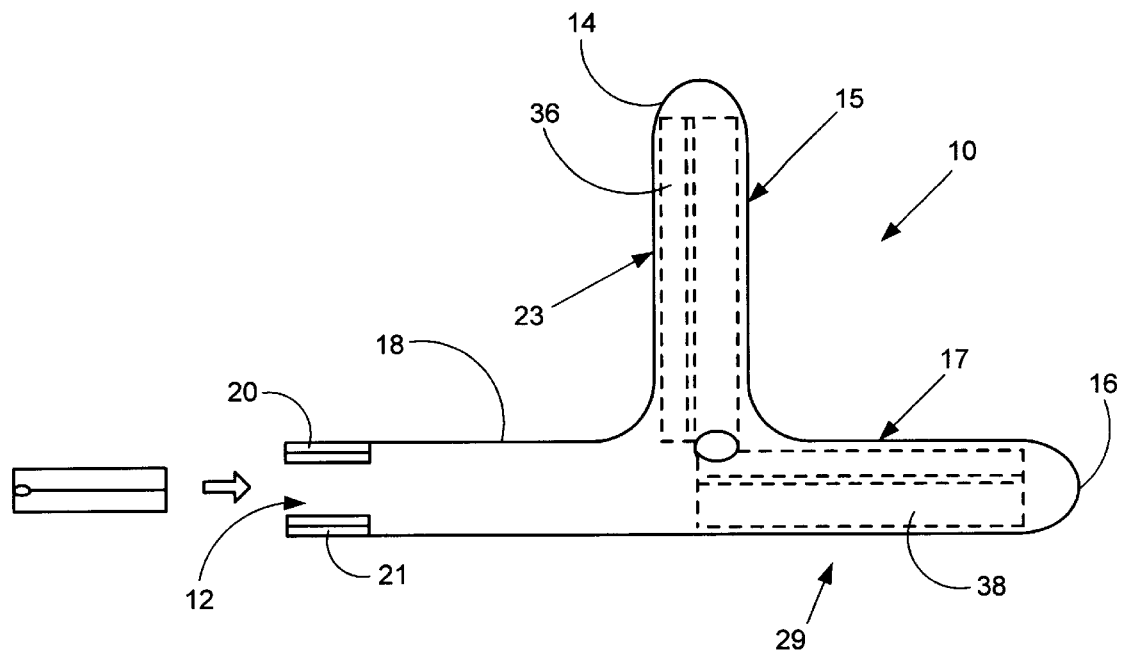
FIG. 1 is a cross-sectional view of a protective cover for a notebook computer in accordance with the present invention with the notebook computer being shown in its closed state outside the protective cover and in phantom in its open state within the protective cover.
Figure 2:
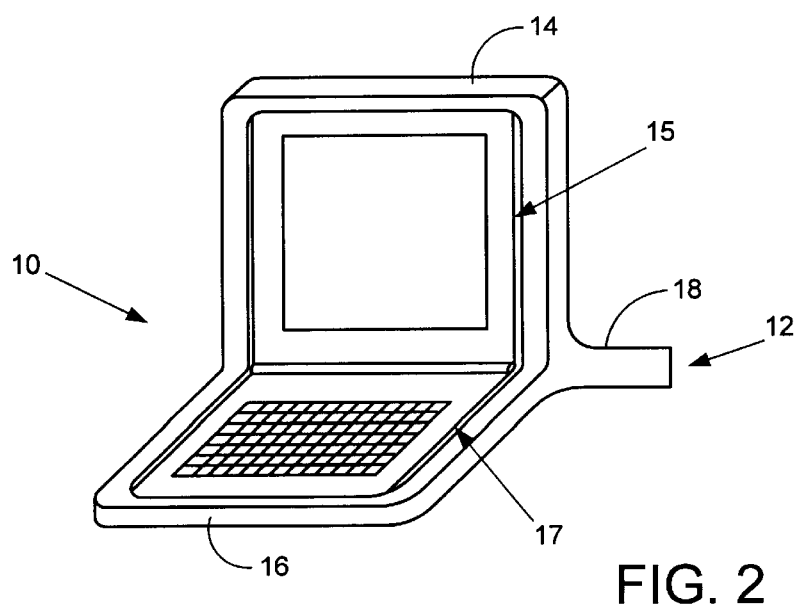
FIG. 2 is a perspective view of the protective cover of FIG. 1 showing the notebook computer installed and in its open state.

FIGS. 1 and 2 depict a preferred embodiment of the protective cover 10 for a notebook computer (shown in phantom) in accordance with the present invention. The protective cover 10 acts somewhat like a glove for the notebook computer. The computer is slid into the open back end 12 of the cover, with the screen portion of the computer being inserted into a top pocket 14 of the cover and the keyboard section of the computer being inserted into a bottom pocket 16 of the cover. The top and bottom pockets 14, 16 are preferably sized so as to fit snugly around the respective screen and keyboard sections of the computer, while still allowing easy installation of these sections in to the pockets. However, if desired, the dimensions can be somewhat looser so as to accommodate notebook computers of various sizes. Further, it is noted that in one version of the protective cover 10, the thickness of the top and bottom pockets 14, 16 is increased so as to accommodate a shock absorbing structure, as will be discussed in detail later in the description.

The portions of the interior walls 15, 17 of the top and bottom pockets 14, 16 which overlie the respective screen and keyboard sections of the notebook computer, as well as the hinged section of the computer between the screen and keyboard sections, are made of a transparent material, preferably plastic. This allows the user to see the computer screen, keyboard, and indicator lights typically found on the hinged section, during operation of the computer. In addition, at least the portion of the transparent material overlying the keyboard section of the notebook computer is preferably made of a relatively soft, transparent plastic so as to be sufficiently flexible to facilitate striking individual ones of the computer keys without inadvertently activating any of the surrounding keys. Further, this flexible, transparent portion of the interior wall 17 overlying the keyboard could be shaped such that it conforms to the contours of the keys of the keyboard in a manner well known in the art. This conforming feature would enhance the "feel" of the keyboard and make it easier to operate the computer. The remaining, non-transparent portions of the cover 10 are preferably made of a durable, waterproof material, such as nylon.

Figure 3A:
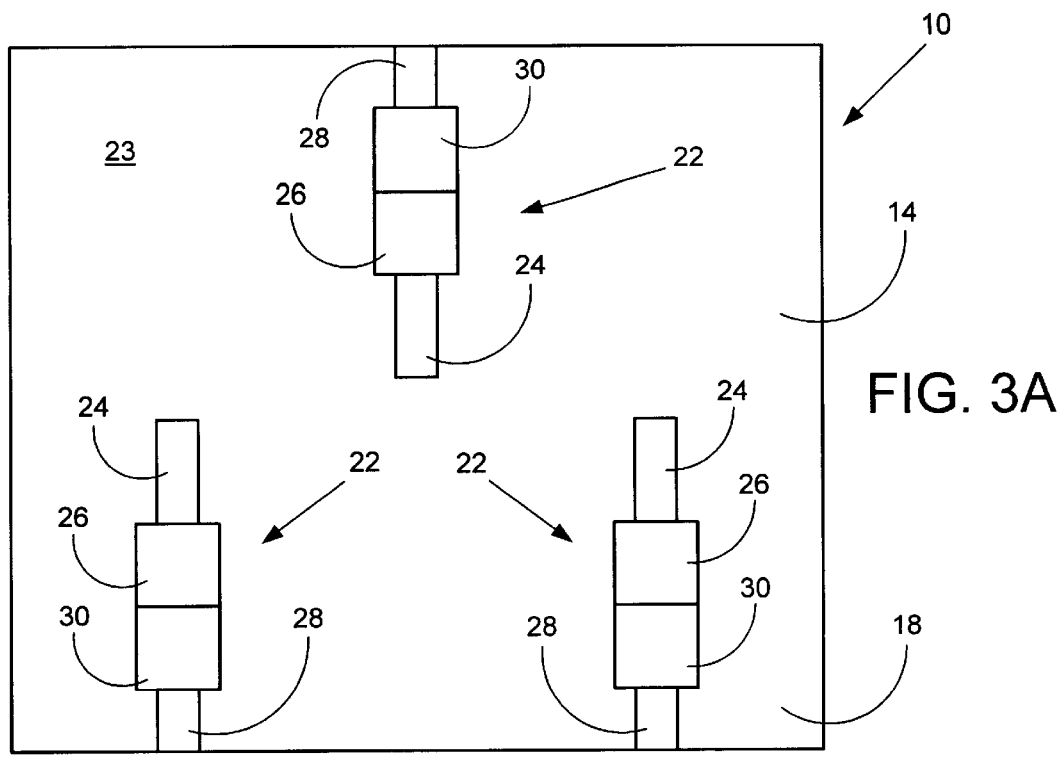
FIG. 3A is a top view of the protective cover of FIG. 1 showing the entry sleeve folded and secured against the top pocket.

The open back end 12 of the cover is connected to both the top and bottom pockets 14, 16 via an extended entry sleeve 18 which is sized so as to allow the notebook computer in its closed state to just pass unhindered therethrough. Although, here too it is noted the dimensions can be somewhat larger than necessary to accommodate notebook computers of various sizes. Once the computer is in position within the protective cover 10, the open back end 12 can be sealed and the entry sleeve 18 folded out of the way, as shown in FIG. 3A. The sealing of the entry sleeve 18 can be accomplished by employing any appropriate mechanism, such as a zipper, Velcro fastener strips, or the like. In addition, the sealing mechanism employed is preferably non-permanent in nature, in that it can be unsealed and resealed as many times as desired to accommodate inserting and removing the notebook computer numerous times. Further, the sealing mechanism can be of a type which provides a hermetic or watertight seal when the notebook computer is to be used extremely hostile environments, such as where there is a possibility the computer could become submerged in water. Opposing, 1.5 inch wide, male and female Velcro fastener strips 20, 21 attached to the interior of the entry sleeve 18 adjacent its open end 12, form the sealing mechanism depicted in FIG. 1. This is the preferred sealing mechanism where a hermetic or watertight seal is not required.

Figure 3B:
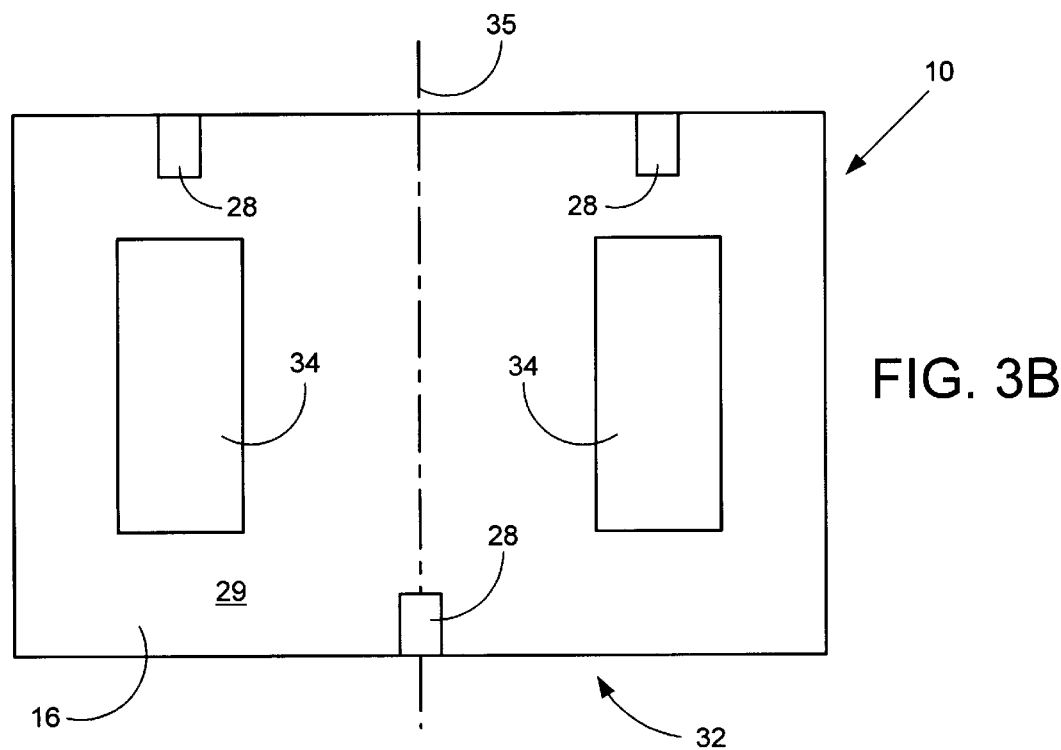
FIG. 3B is a bottom view of the protective cover of FIG. 1.

The entry sleeve 18 is preferably folded out of the way by rolling it into a flatten tube which can be secured to the outer surface of the exterior wall 23 of the top pocket 14. The rolled-up sleeve 18 is secured to the top pocket 14, rather than the bottom pocket 16, so that the notebook computer is not forced to rest on the sleeve 18 when the computer is in use. This securing can be accomplished by any appropriate method. For example, a zipper, Velcro fastener strips, or the like could be employed. However, a strap arrangement is preferred. One particularly preferred version of the strap arrangement is shown in FIGS. 3A and 3B. This version has a pair of two-part straps 22 disposed toward opposite ends of the cover 10. Each two-part strap 22 has a first strap piece 24 which is attached at its first end to the outer surface of the exterior wall 23 of the top pocket 14. The other end of the first strap piece 24 is attached to a male buckle piece 26. Similarly, a second strap piece 28 of the two-part strap is attached at its first end to the outer surface of the exterior wall 29 of the bottom pocket 16. The other end of this second strap piece 28 is attached to a female buckle piece 30 which is designed to mate with the male buckle piece 26 to join the loose ends of the two-part strap 22 together. It is noted that the positions of the male and female buckle pieces 26, 30 could be reversed, if desired. The length of each of the second strap pieces 28 is made such that they can extend from the outer surface of the bottom pocket 16 to a location at least partially overlying the rolled-up entry sleeve 18 adjacent the outer surface of the top pocket 14. The first strap pieces 24 are made long enough to allow the male and female buckle pieces 26, 30 to mate and hold the rolled-up entry sleeve 18 securely against the top pocket 14. The two-part straps 22 can be made of any appropriate materials. For example, one inch nylon webbing could be used for the first and second strap pieces and a Fastex buckle could be used to join them.

As the locking mechanism employed on a typical notebook computer to maintain the screen and keyboard section in their closed positions will be inoperative when the computer is installed in the protective cover 10, an alternate closure device is included on the cover itself. This alternate closure device can once again be any appropriate apparatus such as a zipper, Velcro fastener strips, strap arrangement, or the like. However, a single two-piece strap 22' similar to that described above is preferred. The two-piece strap 22' is disposed at about the middle of the cover 10, as shown in FIGS. 3A and 3B. A first strap piece 24' is attached at its first end to the outer surface of the exterior wall 23 of the top pocket 14, while the other end is attached to a male buckle piece 26'. The second strap piece 28' of the two-part strap is attached at its first end to the outer surface of the exterior wall 29 of the bottom pocket 16 and its other end is attached to a female buckle piece 30'. Again, the positions of the male and female buckle pieces 26', 30' could be reversed if desired. The length of the second strap piece 28' is made such that it can extend from the aforementioned outer surface of the bottom pocket 16, around the front end 32 of the cover, and over onto the aforementioned outer surface of the top pocket 14. The first strap piece 24' is made long enough to allow the buckle pieces 26', 30' to mate and hold the notebook computer in a closed position. It is noted that the buckles of all the above-described two-piece straps 22, 22' are located adjacent the outer surface of the top pocket 14 when mated. This ensures the computer is not resting on the buckles during its operation.

The cover 10 can also employ two non-slip pads 34 attached to the exterior surface of the bottom pocket 16, as shown in FIG. 3B. These pads 34 are employed to keep the notebook computer and cover 10 from sliding on a wet surface should the computer be placed on such a surface. The pads 34 are preferably place at equal distances from the longitudinal centerline 35 of the cover and closer to the outer edges than to the centerline. This ensures the notebook computer will rest securely on whatever surface it is placed without any rocking from side to side as could result if the pads 34 were positioned too close together. Likewise, it is preferred that the pads 34 be long enough to prevent any fore and aft rocking of the notebook computer. As an example, five by two inch rubber-like pads having a thickness of about one-sixteen of an inch attached to the outer surface of the bottom pocket 16 at least four inches from the longitudinal centerline 35 would be appropriate for most applications.

As alluded to above, the cover 10 can also employ a shock absorbing structure. This structure is used to protect the computer from damage caused by impact with other objects during transit and when in use in a hostile environment (e.g. such as might result when equipment is moved about in the vicinity of the notebook computer). As shown in FIG. 1, the shock absorbing structure can take the form of protective pads 36, 38 disposed between the external walls of the top and bottom pockets 14, 16 and the screen and keyboard sections of the notebook computer, respectively. Any conventional shock absorbing padding material can be employed for the pads 36,38. The pads 36, 38 should have sufficient thickness to provide an amount of shock absorption consistent with typical impacts the notebook computer may reasonably encounter during transit and use. The pads 36, 38 also preferably have a length and width approximately as large as the length and width of the screen and keyboard sections of the notebook computer, respectively. The pads 36, 38 can be directly attached to the interior surface of the external walls 23, 29 of the top and bottom pockets 14, 16, respectively, such as with an appropriate adhesive. Alternately, the pads 36, 38 can be contained within pouches (not shown) affixed to the interior surface of the exterior wall of each of the top and bottom pockets 14, 16. These pouches would preferably be closed on three sides and open on a fourth side which faces toward the open end 12 of the entry sleeve 18. The use of pouches to retain the pads 36, 38 has the advantage of allowing the them to be removed if not needed, or replaced if they becomes worn or contaminated.

The aforementioned padding could also be replaced with inflatable bladders of any appropriate conventional configuration. These bladders could be filled with a liquid, gel, or gas, so as to provide shock protection for the notebook computer. The bladders could be permanently filled, or alternately of the type which can be filled or deflated as necessary by the user. This alternate inflatable-deflatable construction would allow notebook computers of various sizes to be secured within the cover and protected from shock.

While the invention has been described in detail by reference to the preferred embodiment described above, it is understood that variations and modifications thereof may be made without departing from the true spirit and scope of the invention.

Wherefore, what is claimed is:

1. A protective cover for a notebook computer, said notebook computer comprising a screen section, keyboard section, and hinged section connecting the screen section to the keyboard section, said protective cover comprising:

a top pocket capable of having the screen section and a first portion of the hinged section inserted therein; and a bottom pocket capable of having the keyboard section and a remaining portion of the hinged section inserted therein; and wherein the top and bottom pockets have a common interior wall which at least overlies the screen, keyboard, and hinged sections of the notebook computer whenever said sections are inserted into the top and bottom pockets; and wherein first and second portions of the common interior wall which respectively overlie the screen and keyboard sections of the notebook computer, whenever the screen and keyboard sections are inserted into the top and bottom pockets, are transparent so as to allow an operator to see the screen and keyboard sections through the first and second transparent portions of the common interior wall.

2. The protective cover of claim 1, wherein a third portion of the interior wall overlying the hinged section of the notebook computer, whenever the hinged section is inserted into the top and bottom pockets, is transparent so as to allow the operator to see the hinged section through the third transparent portion of the common interior wall.

3. The protective cover of claim 1, wherein the second transparent portion of the interior wall is flexible and capable of allowing activation of a key on the keyboard section of the notebook computer without inadvertently activating any adjacent key.

4. The protective cover of claim 3, wherein the flexible, second transparent portion of the interior wall has a shape capable of conforming to the keys of the keyboard section of the notebook computer whenever said keyboard section is inserted into the bottom pocket of the protective cover.

5. The protective cover of claim 1, wherein the top and bottom pockets have respective exterior walls opposite said common interior wall, said protective cover further comprising an entry sleeve having an open first end and a second end connected at an upper side to the exterior wall of the top pocket and at a lower side to the exterior wall of the bottom pocket, said entry sleeve being sized such that the notebook computer can be slid through the sleeve from the open end thereof.

6. The protective cover of claim 5, wherein the entry sleeve comprises a sealing mechanism adjacent to the open end of the sleeve which is capable of holding the open end closed.

7. The protective cover of claim 6, wherein the sealing mechanism is further capable of providing a watertight seal to prevent intrusion of liquids into the interior of the protective cover.

8. The protective cover of claim 6, wherein the sealing mechanism is further capable of providing a hermetic seal to prevent intrusion of liquids or gases into the interior of the protective cover.

9. The protective cover of claim 5, wherein the entry sleeve is capable of being folded onto the outer surface of the exterior wall of the top pocket, said protective cover further comprising a entry sleeve securing means for releasably securing the entry sleeve to the outer surface of the exterior wall of the top pocket, whereby the entry sleeve can be secured to the protective cover once the notebook computer is installed therein.

10. The protective cover of claim 1, further comprising a notebook computer securing means for releasably securing the top pocket to the bottom pocket, whereby the screen and keyboard sections of the notebook computer can be held in a closed position by the notebook computer securing means whenever installed within the top and bottom pockets, respectively.

11. The protective cover of claim 1, further comprising at least one non-slip pad attached to the outer surface of the exterior wall of the bottom pocket so as to prevent slipping of the notebook computer when installed in the cover should it be placed onto a slippery surface.

12. The protective cover of claim 11, wherein two non-slip pads are attached to the outer surface of the exterior wall of the bottom pockets in such a relationship to each other as to prevent rocking of the notebook computer about the pads whenever the computer is installed within the protective cover.

13. The protective cover of claim 1, further comprising a shock absorbing apparatus capable of protecting the notebook computer from damage due to an impact with other objects whenever the computer is installed in the protective cover.

14. The protective cover of claim 13, wherein the shock absorbing apparatus comprises first and second shock absorbing units respectively disposed adjacent the inner surface of the exterior wall of the top pocket and the inner surface of the exterior wall of the bottom pocket.

15. The protective cover of claim 14, wherein the first shock absorbing unit is removably retained within a first pouch affixed to the inner surface of the exterior wall of the top pocket, and the second shock absorbing unit is removably retained within a second pouch affixed to the inner surface of the exterior wall of the bottom pocket.

16. The protective cover of claim 14, wherein said first and second shock absorbing units comprise shock absorbing pads.

17. The protective cover of claim 14, wherein the shock absorbing units comprise shock absorbing bladders filled with one of a liquid, gel, or gas.

18. The protective cover of claim 17, wherein each shock absorbing bladder is adjustably fillable with a gas by a user.

19. A method for protecting a notebook computer comprising a screen section, keyboard section, and hinged section connecting the screen section to the keyboard section, from debris and moisture associated with a hostile environment while at the same time allowing the notebook computer to be operated in the hostile environment, said method comprising the step of:

encasing the notebook computer into a protective cover capable of preventing debris and moisture form reaching the computer and capable of allowing the notebook computer to be placed in an open position, said protective cover further allowing an operator to see through the portions thereof overlying the screen, keyboard, and hinged sections of the computer and allowing the operator to operate the keyboard section of the computer through the portion of the cover overlying the keyboard section.

20. A protective cover for a notebook computer, said notebook computer comprising a screen section, keyboard section, and hinged section connecting the screen section to the keyboard section, said protective cover comprising:

a top pocket capable of having the screen section and a first portion of the hinged section inserted therein; and a bottom pocket capable of having the keyboard section and a remaining portion of the hinged section inserted therein; and wherein the top and bottom pockets have a common interior wall which at least overlies the screen, keyboard, and hinged sections of the notebook computer whenever said sections are inserted into the top and bottom pockets; and wherein first and second portions of the common interior wall which respectively overlie the screen and keyboard sections of the notebook computer, whenever the screen and keyboard sections are inserted into the top and bottom pockets, are transparent so as to allow an operator to see and use the screen and keyboard sections through the first and second transparent portions of the common interior wall; and wherein the top and bottom pockets are capable of sealing an interior thereof from a surrounding, external environment so as to prevent contact between the external environment and the notebook computer whenever the computer is installed within the protective cover, even when the notebook computer is in an open position and being operated by a user thereof.

* * * * *